Oct. 13, 1925.

C. J. SMITH 1,557,102

COTTON CHOPPER

Filed Oct. 26, 1923

Inventor
C. J. Smith

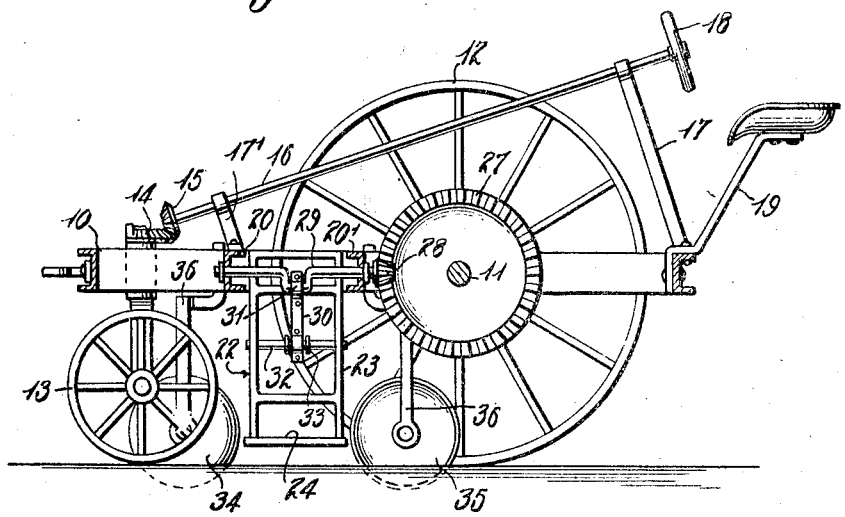

Patented Oct. 13, 1925.

1,557,102

UNITED STATES PATENT OFFICE.

CHARLIE J. SMITH, OF McKINNEY, TEXAS.

COTTON CHOPPER.

Application filed October 26, 1923. Serial No. 670,948.

*To all whom it may concern:*

Be it known that I, CHARLIE J. SMITH, a citizen of the United States, residing at McKinney, in the county of Collin and State of Texas, have invented certain new and useful Improvements in Cotton Choppers, of which the following is a specification.

This invention relates to a cotton chopper and has for its principal object to provide an improved chopping mechanism capable of operating in a thorough and efficient manner.

A further object of the invention is to provide a chopping mechanism embodying cutter frames pivotally mounted in the frame of the machine and mechanically operated to open and close for chopping the cotton as the machine is driven astride the row.

A further and additional object is to provide a cotton chopping machine of generally improved constructions and design, embodying but few parts capable of being readily and conveniently assembled or taken apart whenever required for any purpose.

Various other objects and advantages of the invention may become apparent from the following disclosure.

In the drawings:

Figure 2 is a sectional view thereof as taken upon a central vertical plane taken longitudinally through the machine.

Figure 3 is an enlarged detailed view of the chopping mechanism and

Figure 1:
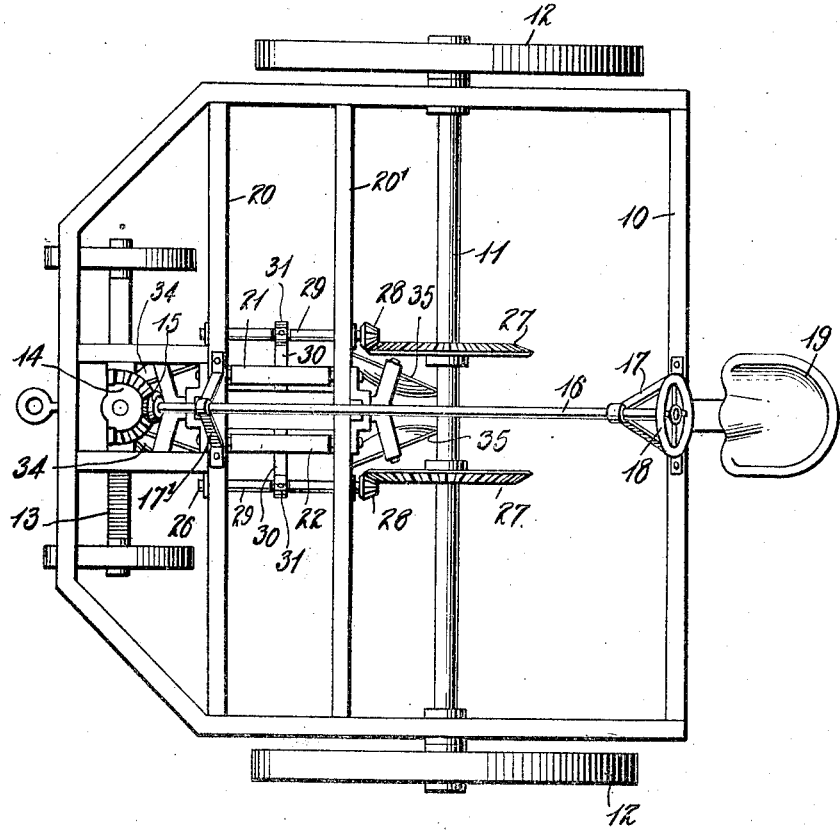
Figure 1 is a top plan view of the proposed invention.

Describing the invention in detail, 10 designates the frame of the machine which may be of channel iron or I-beam construction as preferred. This frame is supported upon a main drive shaft or axle 11, on which are provided wheels 12. A suitable steering truck 13 is arranged at the front of the frame and embodies a sector gear 14 in mesh with pinion 15, the latter being carried by steering rod 16. This steering rod is suitably supported in brackets 17—17' extending upwardly from the frame and at its higher end, the rod is provided with a steering wheel 18 arranged in proximity to the operator's seat 19, as shown. It will thus be seen that the machine may be conveniently steered in the desired direction from seat 19 merely by turning wheel 18.

Figure 4:
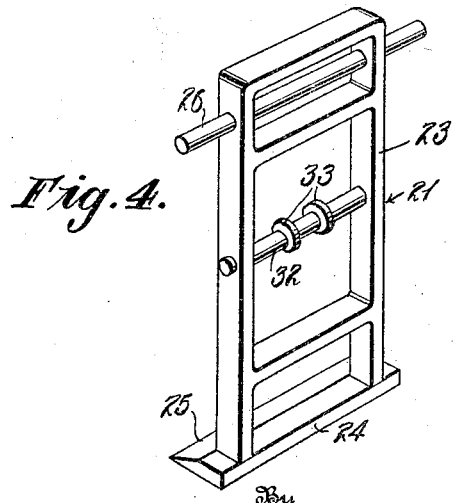
Figure 4 is a detailed view, in perspective, of one of the cutter frames.

The chopping mechanism of the machine is conveniently supported between cross sills 20—20' of the frame and embodies a pair of cutter frames 21 and 22. These frames are similarly constructed and as illustrated in Figure 4 comprise a rectangular frame 23 having a flat horizontally disposed knife blade 24 extending crosswise of its lower end, the said blade having a suitable shearing edge 25, as shown. At its upper end the frame has an opening in each side to permit passage therethrough of a shaft 26 by means of which the frame is supported between sills 20—20'. The frames are arranged oppositely to one another and either swing on shafts 26 or have the shafts journaled in the cross sills so as to turn with the frames when the latter are oscillated.

Each cutter frame is actuated, during the motion of the machine, from drive shaft 11 through the medium of a gear 27 fixed to the latter and in mesh with a pinion 28 on the end of a crank shaft 29, the latter being journaled crosswise of sills 20 and 20' and in spaced parallel relation to the frame, as illustrated in Figures 1 and 3. This crank shaft is connected up with the frame by means of a connecting rod 30 which has one end suitably clamped to the crank of shaft 29 as shown at 31 and its other end likewise clamped to a bearing rod 32 of the frame, the same having fixed collars 33 for centering the connecting rod with respect to the frame. As the crank rods rotate, the frames are alternately swung together and apart, the cutting knives of the frame contacting upon the inner strokes of the frame whereby the cutting and shearing action is produced, as will be readily understood from a consideration of Figure 3. Consequently, as the machine is driven astride a row the swinging cutter frames will chop the cotton in a quick and satisfactory manner.

Located forwardly and rearwardly of the cutter frame are pairs of disks 34 and 35 respectively. These disks are suitably supported in hangers 36 depending from the frame of the machine and the front pair serve to throw the dirt away from the cotton and the front of the cutting knives whereas the pair behind the cutter frame serve to throw it back after the cotton has been chopped.

From the foregoing it is believed that the advantages and novel features of the invention can be readily understood and that further detailed description thereof is not required.

What is claimed is:

1. In a cotton chopper, a wheel frame, a drive shaft therein, a pair of spaced apart, short crank shafts journaled in said frame and geared to the said drive shaft, a pair of cutters pivoted to the frame and depending downwardly therefrom, said cutters being arranged in the space between the said crank shafts, and an operating connection between the said crank shafts and the said pivoted cutters for causing the latter to be alternately brought together and separated.

2. In a cotton chopper, in combination, a wheeled frame, a pair of rectangular cutter frames having their respective upper ends pivotally supported in the said frame and being arranged opposite to each other to pass on opposite sides of a cotton row, a flat horizontally disposed knife blade mounted crosswise of the lower end of each cutter frame, and means for rocking said cutter frames simultaneously on their respective pivots for causing the said knive blades to be alternately brought together and separated.

In testimony whereof I affix my signature.

C. J. SMITH.